US012359015B2

(12) United States Patent
Seehagen et al.

(10) Patent No.: US 12,359,015 B2
(45) Date of Patent: *Jul. 15, 2025

(54) LOW-VISCOSITY, RAPID CURING LAMINATING ADHESIVE COMPOSITION

(71) Applicant: Henkel AG & Co. KGaA, Duesseldorf (DE)

(72) Inventors: Ines Seehagen, Neuss (DE); Michael Hoeltgen, Duesseldorf (DE); Helga Garmann, Hilden (DE); Dennis Bankmann, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 760 days.

This patent is subject to a terminal disclaimer.

(21) Appl. No.: 16/418,065

(22) Filed: May 21, 2019

(65) Prior Publication Data

US 2019/0270838 A1 Sep. 5, 2019

Related U.S. Application Data

(63) Continuation of application No. PCT/EP2017/080028, filed on Nov. 22, 2017.

(30) Foreign Application Priority Data

Nov. 25, 2016 (EP) .................... 16200721
Nov. 25, 2016 (EP) .................... 16200722
Feb. 16, 2017 (EP) .................... 17156423

(51) Int. Cl.
*C08G 18/48* (2006.01)
*B32B 7/12* (2006.01)
*B32B 27/08* (2006.01)
*B32B 27/32* (2006.01)
*B32B 27/34* (2006.01)
(Continued)

(52) U.S. Cl.
CPC ............ *C08G 18/4829* (2013.01); *B32B 7/12* (2013.01); *B32B 27/08* (2013.01); *B32B 27/32* (2013.01); *B32B 27/34* (2013.01); *B32B 27/40* (2013.01); *B32B 37/1284* (2013.01); *B32B 37/16* (2013.01); *C08G 18/12* (2013.01); *C08G 18/3206* (2013.01); *C08G 18/36* (2013.01); *C08G 18/4804* (2013.01); *C08G 18/4812* (2013.01); *C08G 18/4833* (2013.01); *C08G 18/4858* (2013.01); *C08G 18/6644* (2013.01); *C08G 18/6696* (2013.01); *C08G 18/724* (2013.01); *C08G 18/7621* (2013.01); *C08G 18/7671* (2013.01); *C08G 18/7685* (2013.01); *C08G 18/792* (2013.01); *C09J 5/00* (2013.01); *C09J 175/04* (2013.01); *C09J 175/08* (2013.01); *C09J 175/14* (2013.01); *B32B 37/0053* (2013.01); *B32B 2255/10* (2013.01); *B32B 2255/205* (2013.01); *B32B 2305/72* (2013.01); *B32B 2375/00* (2013.01); *B32B 2439/70* (2013.01); *B32B 2439/80* (2013.01);
(Continued)

(58) Field of Classification Search
CPC ............... C08G 18/4829; C08G 18/12; C08G 18/3206; C08G 18/4804; C08G 18/4858; C08G 18/6644; C08G 18/724; C08G 18/7671; C08G 18/7685; C08G 18/6696; C08G 18/4812; C08G 18/4833; C08G 18/36; C08G 18/7621; C08G 18/792; C08G 2170/00; B32B 7/12; B32B 27/08; B32B 27/32; B32B 27/34; B32B 37/1284; B32B 37/16; B32B 27/40; B32B 2255/10; B32B 2255/205; B32B 2553/00; B32B 37/0053; B32B 2305/72; B32B 2375/00; B32B 2439/70; B32B 2439/80; C09J 5/00; C09J 175/08; C09J 175/04; C09J 2475/00; C09J 175/14

See application file for complete search history.

(56) References Cited

U.S. PATENT DOCUMENTS 4,623,709 A 11/1986 Bauriedel
5,045,623 A 9/1991 Horn et al.
(Continued)

FOREIGN PATENT DOCUMENTS

EP 0150444 A2 8/1985
EP 1074597 A2 2/2001
(Continued)

OTHER PUBLICATIONS

Odian, George, Principles of Polymerization, Third Edition, 1991, John Wiley & Sons, Inc., pp. 19-24.*
(Continued)

*Primary Examiner* — Patrick D Niland
(74) *Attorney, Agent, or Firm* — Sun Hee Lehmann

(57) ABSTRACT

The invention relates to a 2-component polyurethane adhesive, in particular for laminating films, wherein the PU adhesive, based on the total weight of the laminating adhesive composition, (a) contains as resin component at least one NCO-terminated polyurethane pre-polymer having a content of at least 40% by weight of diphenylmethandiisocyanate (MDI), wherein the MDI is 4,4'-diphenylmethandiisocyanate or a mixture thereof with 2,4'-diphenylmethandiisocyanate, and (b) contains as hardener component a polyol mixture comprising at least three different polyols. The invention further relates to the use of the adhesive for adhesively bonding films, to methods for producing composite films, and to composite films bonded by means of the described adhesive.

20 Claims, No Drawings

(51) Int. Cl.
  *B32B 27/40*    (2006.01)
  *B32B 37/00*    (2006.01)
  *B32B 37/12*    (2006.01)
  *B32B 37/16*    (2006.01)
  *C08G 18/12*    (2006.01)
  *C08G 18/32*    (2006.01)
  *C08G 18/36*    (2006.01)
  *C08G 18/66*    (2006.01)
  *C08G 18/72*    (2006.01)
  *C08G 18/76*    (2006.01)
  *C08G 18/79*    (2006.01)
  *C09J 5/00*     (2006.01)
  *C09J 175/04*   (2006.01)
  *C09J 175/08*   (2006.01)
  *C09J 175/14*   (2006.01)

(52) U.S. Cl.
  CPC ...... *B32B 2553/00* (2013.01); *C08G 2170/00* (2013.01); *C09J 2475/00* (2013.01)

(56) References Cited

U.S. PATENT DOCUMENTS

| | | |
|---|---|---|
| 6,515,164 B1 | 2/2003 | Bolte et al. |
| 6,903,167 B2 | 6/2005 | Bolte et al. |
| 9,458,363 B2 | 10/2016 | Kollbach et al. |
| 9,914,862 B2 | 3/2018 | Kelch et al. |
| 2005/0020706 A1 | 1/2005 | Kollbach et al. |
| 2007/0129525 A1 | 6/2007 | Eichelmann et al. |
| 2012/0000603 A1 | 1/2012 | Karafilidis et al. |
| 2012/0156506 A1* | 6/2012 | Shah .................. C08G 18/4829 156/331.7 |
| 2012/0263836 A1 | 10/2012 | Carlson et al. |
| 2016/0053147 A1* | 2/2016 | Kelch .................. C04B 26/16 156/331.4 |
| 2017/0121578 A1* | 5/2017 | Garmann .................. B32B 7/12 |
| 2017/0334183 A1 | 11/2017 | Kimura et al. |

FOREIGN PATENT DOCUMENTS

| | | |
|---|---|---|
| EP | 0951493 B1 | 6/2001 |
| EP | 1456265 A1 | 9/2004 |
| EP | 1341832 B1 | 10/2016 |
| JP | 2005089491 A | 4/2005 |
| JP | 2018030905 A | 3/2018 |
| RU | 2448987 C2 | 4/2012 |
| WO | 9309158 A1 | 5/1993 |
| WO | 2005097861 A1 | 10/2005 |
| WO | 2010091806 A1 | 8/2010 |
| WO | 2012054922 A2 | 4/2012 |
| WO | 2014031846 A2 | 2/2014 |
| WO | 2014184270 A1 | 11/2014 |
| WO | 2016001265 A1 | 1/2016 |
| WO | WO 2016/001265 * | 1/2016 |
| WO | 2016152370 A1 | 9/2016 |
| WO | 2016164526 A1 | 10/2016 |

OTHER PUBLICATIONS

Sonnenschein, Polyurethanes—Science, Technology, Markets and Trends, John Wiley & Sons 2015.
Sutyagin et al., Chemistry and Physics of Polymers Textbook.
Ullmann's encyclopedia of industrial chemistry, Wiley-VCH Verlag GmbH & Co. KGaA, pp. 553-554.
International Search Report for International PCT Patent Application No. PCT/EP2017/080028 dated Feb. 23, 2018.
DIN 53240-1:2013-06.
DIN 55672-1:2007-08.
DIN EN ISO 11909:2007-05.
DIN ISO 2555.
DIN 53357.
International Search Report for International PCT Patent Application No. PCT/EP2017/080025 dated Mar. 2, 2018.

* cited by examiner

LOW-VISCOSITY, RAPID CURING LAMINATING ADHESIVE COMPOSITION

The present invention relates to a two-component polyurethane adhesive, in particular for laminating films, wherein the PU adhesive contains, based on the total weight of the laminating adhesive composition, (a) as resin component at least one NCO-terminated polyurethane prepolymer having a content of at least 40 wt. % diphenylmethane diisocyanate (MDI), wherein the MDI is 4,4'-diphenylmethane diisocyanate or a mixture thereof with 2,4'-diphenylmethane diisocyanate, and (b) as a curing component a polyol mixture comprising at least three different polyols. The present invention further relates to the use of the adhesive for bonding films, to methods for producing composite films, and to composite films bonded using the described adhesive.

Laminating adhesives are generally known in industry. They are solvent-containing or solvent-free, crosslinking or physically setting adhesives which are used to bond thin, flat substrates, such as plastics films, metal foils, paper, or cardboard, to one another. It is essential in these cases that the bond only slightly reduces the flexibility of the thin individual plies but nevertheless achieves sufficient adhesion. Selection of the individual film plies makes it possible to influence specific properties of these multilayer films, in particular permeability to water, other liquids, chemical resistance, and permeability to oxygen or other gases.

From such multilayer films, for example, packaging for foodstuffs in solid, pasty or liquid form, plastic cutlery, medical materials, chemical products, cosmetics, cleaning agents or objects are manufactured. Furthermore, such laminates are used for technical products such as flexible conductors, electrical insulation materials, sails or components for photovoltaics.

The above-stated fields of application related to food mean that these multilayer films cannot contain any substances that might migrate out of the packaging into the packaged goods in quantities that are harmful to health. Finally, it is also desirable that the multilayer films have a pleasing visual appearance.

As adhesives for such fields of application, 2-component systems in particular are known in the prior art, especially polyurethane-based 2K systems. These are mixed before use and then applied in amounts of typically around 1-5 g/m$^2$ to one of the films to be bonded. By laminating the second film on the side of the first film that is coated with the adhesive, it is possible to obtain composite films after curing which are used as packaging material, in particular for food but also for the other uses mentioned above. Adhesive systems of this kind are usually transparent.

Disadvantages of the known systems, however, are that polyurethane-based 2-component systems have an excess of monomeric isocyanate groups. This excess has to react with water in order to yield a fully cured product. During this reaction, in turn, primary aromatic amines (PAA) are formed, which have to be degraded by reacting with other isocyanate groups. According to European regulations, foods may only be provided with packaging containing primary aromatic amines below a detection limit of 10 ppb. Another disadvantage of a high proportion of monomeric isocyanate groups is longer curing times. However, relatively low viscosities can be achieved using such systems, which ensure good processability.

In the prior art, the use of hexane-1,6-diisocyanate (HDI) is known to promote the degradation of the primary aromatic amines. Usually, systems of this kind are formulated with prepolymerized components in order to reduce the content of monomeric isocyanate groups. Furthermore, polyester polyols are used to increase adhesion. However, these systems have relatively high viscosities and, in the case of run times of >250 m/min in laminating machines, lead to undesirable misting during processing.

The object of the present invention was therefore to provide polyurethane adhesives that do not have the disadvantages mentioned.

More specifically, it was surprisingly found that the above-mentioned disadvantages can be overcome by a polyurethane-based 2-component system containing at least one NCO-terminated polyurethane prepolymer having a content of at least 40 wt. % diphenylmethane diisocyanate (MDI), wherein the MDI is 4,4'-diphenylmethane diisocyanate or a mixture thereof with 2,4'-diphenylmethane diisocyanate, as a resin component, and a polyol mixture comprising at least three different polyols as a curing component. The systems as described herein are characterized by good processability (low viscosities, >300 m/min in laminating machines) and fast chemical (PAA degradation) as well as physical cure rates.

In a first aspect, the invention therefore relates to a polyurethane-based 2-component laminating adhesive composition, in particular for laminating films, containing, based on the total weight of the laminating adhesive composition, (a) as a resin component at least one NCO-terminated polyurethane prepolymer having a content of at least 40 wt. % diphenylmethane diisocyanate (MDI), wherein the MDI is 4,4'-diphenylmethane diisocyanate or a mixture thereof with 2,4'-diphenylmethane diisocyanate, and (b) as a curing component a polyol mixture comprising at least three different polyols, In a further aspect, the invention relates to a method for producing composite films, in which method at least two identical or different plastics films are bonded using a laminating adhesive composition as described herein, and to correspondingly produced composite films.

The invention also relates to the use of composite films produced in this way as packaging, in particular for the packaging of medicaments or foods.

In yet another aspect, the invention relates to the use of the laminating adhesive compositions described herein for bonding films.

Unless stated otherwise, the molecular weights indicated in the present text relate to the number average of the molecular weight (Mn). The molecular weight Mn can be determined based on an end-group analysis (hydroxy number according to DIN 53240-1:2013-06), or by means of gel permeation chromatography (GPC) according to DIN 55672-1:2007-08 with polystyrene as standard and THF as an eluent. Unless stated otherwise, the molecular weights indicated are those that were determined by means of hydroxyl number. The weight average of the molecular weight Mw can also be determined by means of GPC, as indicated previously.

In relation to an ingredient, the expression "at least one" relates to the type of ingredient and not to the absolute number of molecules. "At least one polyol" therefore means, for example, at least one type of polyol, i.e., that one type of polyol or a mixture of a plurality of different polyols can be used. Together with weight specifications, the expression relates to all compounds of the type indicated that are contained in the composition/mixture, that is to say that the composition does not contain any other compounds of this type beyond the indicated amount of the corresponding compounds.

The "content" as used herein in the context of the NCO-terminated prepolymer refers to the amount of the corresponding constituent in a reaction mixture from which the prepolymer can be obtained, based in each case on the total weight of the reaction mixture. The feature whereby the "resin component contains at least one NCO-terminated polyurethane prepolymer having a content of at least 40 wt. % diphenylmethane diisocyanate (MDI), wherein the MDI is 4,4'-diphenylmethane diisocyanate or a mixture thereof with 2,4'-diphenylmethane diisocyanate" therefore means that this NCO-terminated polyurethane prepolymer can be obtained by reacting a reaction mixture which, based on the total weight of the reaction mixture, contains at least 40 wt. % diphenylmethane diisocyanate (MDI), wherein the MDI is 4,4'-diphenylmethane diisocyanate or a mixture thereof with 2-4'-diphenylmethane diisocyanate. The remainder of the reaction mixture can be formed by compounds with NCO-reactive groups, i.e. in particular polyols, or further polyisocyanates.

Unless explicitly indicated otherwise, all percentages that are cited in connection with the compositions described herein relate to wt. %, in each case with respect to the relevant mixture.

"Approximately" or "ca." as used herein in connection with a numerical value relates to the numerical value±10%, preferably ±5%.

Polyurethane adhesives are generally known. They are also used for laminating multilayer films. The adhesives suitable according to the invention are 2-component polyurethane adhesives. The adhesives may be liquid. The adhesives may contain solvent, but they are preferably solvent-free. The crosslinking of the polyurethane adhesives that are suitable according to the invention is based on the reaction of reactive NCO groups with H-acidic functional groups, for example OH groups, amino groups or carboxyl groups. An alternative crosslinking method involves the reaction of the NCO groups with moisture from the applied adhesive, the substrate or the surroundings with formation of urea groups. These crosslinking reactions are known and may also proceed concurrently. In order to accelerate reactions of this kind, catalysts can be introduced into the adhesive, for example amine, titanium or tin catalysts.

It has surprisingly been found in tests for determining migrated substances that the systems described herein in comparison with the systems common in the prior art of other compositions, release fewer primary aromatic amines (PAA), as a result of which what is known as the PAA decay time significantly decreases. When curing polyurethanes, these PAA arise from free polyisocyanates, which react under the action of moisture so as to yield the corresponding amines. Since PAA are considered harmful to health, it is desirable to reduce or prevent their formation or their migration into the packaged good. As the curing progresses, although the PAA formed in the meantime react with isocyanate surplus, the more PAA that are formed in the intermediate stage, the longer the time taken to achieve a substantially "migration-free" composite.

Furthermore, it has surprisingly been demonstrated that, due to the 2-component (2K) formulations described herein, the bond adhesion of selected systems, despite low polyester polyol contents, does not decrease but in some cases even increases. This means that the formulations described herein can improve the performance of the adhesives. The mechanical properties can also be improved. For example, it has been found that a lowest possible content of less than 10 wt. % of polyesters in the adhesive composition leads to low viscosities, which make it possible to pass through the application machines quickly. In addition, misting, which is typical of polyester-containing adhesive compositions and usually occurs as polyester adhesive compositions pass through the application machine, is prevented. The speed of build up of the bond adhesion of the formulations as described herein is also comparable with or faster than systems known in the prior art.

The adhesive according to the invention is a 2-component (2K) polyurethane adhesive. According to the invention, an adhesive contains at least one NCO-terminated polyurethane prepolymer as a resin component and at least one polyol mixture as a curing component.

The isocyanate (NCO)-terminated PU prepolymers of the resin component are obtained by reacting a polyol or a polyol mixture with a stoichiometric excess of polyisocyanate. The polyols used when producing the prepolymer may be all polyols that are usually used for polyurethane synthesis, for example polyols, polyester polyols, polyether polyols, polyester ether polyols, polycarbonate polyols or mixtures of two or more thereof.

Polyether polyols may be produced from a plurality of alcohols, which contain one or more primary or secondary alcohol groups. As an initiator for the production of polyethers that do not contain any tertiary amino groups, the following compounds or mixtures of said compounds can be used by way of example: Water, ethylene glycol, propylene glycol, glycerol, butanediol, butanetriol, trimethylolethane, pentaerythritol, hexanediol, 3-hydroxyphenol, hexanetriol, trimethylolpropane, octanediol, neopentyl glycol, 1,4-hydroxymethylcyclohexane, bis(4-hydroxyphenyl)dimethylmethane and sorbitol. Ethylene glycol, propylene glycol, glycerol and trimethylolpropane are preferably used, particularly preferably ethylene glycol and propylene glycol, and, in a particularly preferred embodiment, propylene glycol is used.

Alkylene oxides such as ethylene oxide, propylene oxide, butylene oxide, epichlorohydrin, styrene oxide or tetrahydrofuran or mixtures of these alkylene oxides may be used as cyclic ethers for producing the above-described polyethers. Propylene oxide, ethylene oxide or tetrahydrofuran or mixtures thereof are preferably used. Propylene oxide or ethylene oxide or mixtures thereof are particularly preferably used. Propylene oxide is most particularly preferably used.

Polyester polyols can be produced for example by reacting low-molecular-weight alcohols, in particular ethylene glycol, diethylene glycol, neopentyl glycol, hexanediol, butanediol, propylene glycol, glycerol, or trimethylolpropane with caprolactone. 1,4-hydroxymethylcyclohexane, 2-methyl-1,3-propanediol, 1,2,4-butanetriol, triethylene glycol, tetraethylene glycol, polyethylene glycol, dipropylene glycol, polypropylene glycol, dibutylene glycol and polybutylene glycol are also suitable as polyfunctional alcohols for producing polyester polyols.

Further suitable polyester polyols may be produced by polycondensation. Difunctional and/or trifunctional alcohols having a deficiency of dicarboxylic acids or tricarboxylic acids or mixtures of dicarboxylic acids or tricarboxylic acids, or reactive derivatives thereof, may thus be condensed to form polyester polyols. Suitable dicarboxylic acids are, for example, adipic acid or succinic acid and higher homologs thereof having up to 16 carbon atoms, also unsaturated dicarboxylic acids such as maleic acid or fumaric acid and aromatic dicarboxylic acids, in particular isomeric phthalic acids, such as phthalic acid, isophthalic acid or terephthalic acid. Suitable tricarboxylic acids are for example citric acid or trimellitic acid. The aforementioned acids can be used individually or as mixtures of two or more thereof. Particularly suitable alcohols are hexanediol, butanediol, ethylene glycol, diethylene glycol, neopentyl glycol, 3-hydroxy-2,2-dimethylpropyl-3-hydroxy-2,2-dimethylpropanoate or trimethylolpropane or mixtures of two or more thereof. Particularly suitable acids are phthalic acid, isophthalic acid, terephthalic acid, adipic acid or dodecanedioic acid, or mixtures thereof. Polyester polyols having a high molecular weight include for example the reaction products of polyfunctional, preferably difunctional alcohols (optionally together with small quantities of trifunctional alcohols) and polyfunctional, preferably difunctional carboxylic acids. Instead of free polycarboxylic acids, the corresponding polycarboxylic acid anhydrides or corresponding polycarboxylic acid esters can also be used (where possible) with alcohols having preferably 1 to 3 carbon atoms. The polycarboxylic acids can be aliphatic, cycloaliphatic, aromatic or heterocyclic, or both. They may optionally be substituted, for example by alkyl groups, alkenyl groups, ether groups or halogens. Suitable polycarboxylic acids are, for example, succinic acid, adipic acid, suberic acid, azelaic acid, sebacic acid, dodecanedioic acid, phthalic acid, isophthalic acid, terephthalic acid, trimellitic acid, phthalic anhydride, tetrahydrophthalic anhydride, hexahydrophthalic anhydride, tetrachlorophthalic anhydride, endomethylene tetrahydrophthalic anhydride, glutaric anhydride, maleic acid, maleic anhydride, fumaric acid, dimer fatty acid or trimer fatty acid, or mixtures of two or more thereof.

Polyesters that can be obtained from lactones, for example based on epsilon-caprolactone, also referred to as "polycaprolactone", or hydroxycarboxylic acids, for example omega-hydroxy caproic acid, can also be used.

It is, however, also possible to use polyester polyols of oleochemical origin. Polyester polyols of this kind can be produced, for example, by complete ring opening of epoxidized triglycerides of a fat mixture which contains an at least partially olefinically unsaturated fatty acid having one or more alcohols having 1 to 12 carbon atoms and subsequent partial transesterification of the triglyceride derivatives to form alkyl ester polyols having 1 to 12 carbon atoms in the alkyl group.

Polycarbonate polyols can be obtained, for example, by reacting diols such as propylene glycol, butanediol-1,4 or hexanediol-1,6, diethylene glycol, triethylene glycol or tetraethylene glycol or mixtures of said diols with diaryl carbonates, for example diphenyl carbonates, or phosgene.

The molecular weight of the polyols used for synthesizing the prepolymer is preferably in the range of from 100 to 20,000 g/mol, in particular 330 to 4,500 g/mol. The average functionality may be in the range of from 2 to 4.5. The PU prepolymer preferably has a polyether/polyester backbone. In preferred embodiments, however, the composition according to the invention has a polyester content of less than 10 wt. %, based on the total weight of the adhesive composition.

The stoichiometric excess of polyisocyanate in the PU prepolymer is, based on the molar ratio of NCO to OH groups, in particular 1:1 to 1.8:1, preferably 1:1 to 1.6:1 and particularly preferably 1.05:1 to 1.5:1.

The known coating or adhesive polyisocyanates may be used, these being polyisocyanates having two or more isocyanate groups. Suitable polyisocyanates are, for example, 1,5-naphthylene diisocyanate (NDI), 2,4- or 4,4'-diphenylmethane diisocyanate (MDI), hydrogenated MDI (H12MDI), xylylene diisocyanate (XDI), tetramethyl xylylene diisocyanate (TMXDI), di- and tetra alkylene diphenylmethane diisocyanate, 4,4'-dibenzyl diisocyanate, 1,3- or 1,4-phenylene diisocyanate, toluene diisocyanate (TDI), 1-methyl-2,4-diisocyanato-cyclohexane, 1,6-diisocyanato-2,2,4-trimethylhexane, 1,6-diisocyanato-2,4,4-trimethylhexane, 1-isocyanatomethyl-3-isocyanato-1,5,5-trimethylcyclohexane (IPDI), tetramethoxybutane-1,4-diisocyanate, butane-1,4-diisocyanate, hexane-1,6-diisocyanate (HDI), dicyclohexylmethane diisocyanate, cyclohexane-1,4-diisocyanate, ethylene diisocyanate, methylene triphenyl triisocyanate (MIT), phthalic acid-bis-isocyanato ethylester, trimethylhexamethylene diisocyanate, 1,4-diisocyanatobutane, 1,12-diisocyanatododecane and dimer fatty acid diisocyanate.

Suitable at least trifunctional isocyanates are polyisocyanates which are obtained by trimerization or oligomerization of diisocyanates or by reaction of diisocyanates with low-molecular-weight polyfunctional compounds containing hydroxyl or amino groups. Commercially obtainable examples are trimerization products of the isocyanates HDI, MDI or IPDI or adducts of diisocyanates and low molecular weight triols, such as trimethylolpropane or glycerol. Further examples include isocyanurates of hexamethylene diisocyanate (HDI) and isocyanurates of isophorone diisocyanate (IPDI).

Aliphatic, cycloaliphatic, or aromatic isocyanates may in principle be used, but aromatic diisocyanates are particularly suitable. A particularly preferred aromatic diisocyanate is 4,4-methylene diphenyl diisocyanate, which can be used either alone or in admixture with 2,4-methylene diphenyl diisocyanate. The PU adhesives according to the invention may contain the isocyanates in reacted form as PU prepolymers or they contain at least a proportion of low-molecular-weight, optionally oligomeric, isocyanates.

PU prepolymers may be produced in a known manner from the above-mentioned polyols and polyisocyanates. A prepolymer containing NCO groups may be produced in this case from the polyols and isocyanates. Examples thereof are described in EP-A951493, EP-A1341832, EP-A 150444, EP-A 1456265 and WO 2005/097861.

The at least one NCO-terminated PU prepolymer is preferably an aromatic isocyanate-terminated, more preferably MDI-terminated, polyurethane prepolymer of one or more polyether polyol(s) or a polyether/polyester polyol mixture and an aromatic diisocyanate, such as MDI.

According to the present invention, the resin component of the adhesive composition has a content of at least 40 wt. % diphenylmethane diisocyanate (MDI), wherein the MDI is 4,4'-diphenylmethane diisocyanate or a mixture thereof with 2,4'-diphenylmethane diisocyanate. 2,2'-Diphenylmethane diisocyanate is preferably not contained or is contained in comparatively low amounts, i.e. less than 2 wt. %, preferably less than 1 wt. %.

In various embodiments, in addition to the aforementioned MDI, timers of isocyanates, in particular trimerization of hexane-1,6-diisocyanate (HDI) can also be used, for example in amounts of 5 to 15 wt. %.

The corresponding prepolymers usually have an NCO content of from 5-20 wt. % (determined in accordance with Spielberger, DIN EN ISO 11909:2007-05) and have an average NCO functionality of from 2 to 3.

On account of the excess of isocyanate used, the NCO-terminated PU prepolymers usually contain certain amounts of isocyanate monomers, i.e. in particular aromatic polyisocyanate monomers, for example MDI, typically in amounts of from 0.1 to 25 wt. % based on the total weight of prepolymers and monomers.

The molecular weight (Mn) of the prepolymer is in the range of from 1,500 g/mol to 100,000 g/mol, particularly preferably from 2,000 g/mol to 50,000 g/mol.

In the binder system according to the invention, a curing component is contained in addition to the resin component. According to the present invention, the curing component comprises at least three different polyols.

Suitable polyols are aliphatic and/or aromatic alcohols with 2 to 6, preferably 2 to 4, OH groups per molecule. The OH groups may be both primary and secondary.

Suitable aliphatic alcohols include, for example, ethylene glycol, propylene glycol, 1,4-butanediol, 1,5-pentanediol, 1-6-hexanediol, 1,7-heptanediol, 1,8-octanediol, and the higher homologs or isomers thereof. More highly functional alcohols are likewise suitable, for example glycerol, trimethylolpropane, pentaerythritol and oligomeric ethers of the stated substances.

Reaction products of low-molecular-weight polyfunctional alcohols with alkylene oxides are preferably used as the polyol component. The alkylene oxides preferably have 2 to 4 carbon atoms. The reaction products of ethylene glycol, propylene glycol, the isomeric butanediols, hexanediols or 4,4'-dihydroxydiphenylpropane with ethylene oxide, propylene oxide or butylene oxide, or mixtures of two or more thereof are, for example, suitable. The reaction products of polyfunctional alcohols, such as glycerol, trimethylolethane, or trimethylolpropane, pentaerythritol or sugar alcohols, or mixtures of two or more thereof, with the stated alkylene oxides to form polyether polyols are furthermore also suitable. Further polyols that are conventional within the context of the invention are produced from polymerization of tetrahydrofuran (PolyTHF).

Polyethers which have been modified by vinyl polymers are likewise suitable for use as the polyol component. Such products are for example obtainable by polymerizing styrene or acrylonitrile or a mixture thereof in the presence of polyethers.

Further suitable polyols are polyester polyols.

Examples of these are polyester polyols, which are obtained by reacting low-molecular-weight alcohols, in particular ethylene glycol, diethylene glycol, neopentyl glycol, hexanediol, butanediol, propylene glycol, glycerol, or trimethylolpropane with caprolactone.

Further suitable polyester polyols may be produced by polycondensation. Polyester polyols of this kind preferably comprise the reaction products of polyfunctional, preferably difunctional alcohols and polyfunctional, preferably difunctional and/or trifunctional carboxylic acids or polycarboxylic acid anhydrides. Compounds suitable for producing such polyester polyols are in particular hexanediol, 1,4-hydroxymethylcyclohexane, 2-methyl-1,3-propanediol, 1,2,4-butanetriol, triethylene glycol, tetraethylene glycol, ethylene glycol, polyethylene glycol, dipropylene glycol, polypropylene glycol, dibutylene glycol and polybutylene glycol. Proportions of trifunctional alcohols may also be added.

The polycarboxylic acids can be aliphatic, cycloaliphatic, aromatic or heterocyclic, or both. They may optionally be substituted, for example by alkyl groups, alkenyl groups, ether groups or halogens. Suitable polycarboxylic acids are, for example, succinic acid, adipic acid, suberic acid, azelaic acid, sebacic acid, phthalic acid, isophthalic acid, terephthalic acid, trimellitic acid, phthalic anhydride, tetrahydrophthalic anhydride, hexahydrophthalic anhydride, glutaric anhydride, maleic acid, maleic anhydride, fumaric acid, dimer fatty acid or trimer fatty acid, or mixtures of two or more thereof. Proportions of tricarboxylic acids may optionally also be added.

It is, however, also possible to use polyester polyols of oleochemical origin. Polyester polyols of this kind can be produced, for example, by complete ring opening of epoxidized triglycerides of a fat mixture which contains an at least partially olefinically unsaturated fatty acid with one or more alcohols having from 1 to 12 carbon atoms and subsequent partial transesterification of the triglyceride derivatives to form alkyl ester polyols having from 1 to 12 carbon atoms in the alkyl functional group. Further suitable polyols are polycarbonate polyols and dimer diols (from Henkel) and castor oil and the derivatives thereof. Hydroxy-functional polybutadienes, as are for example available under the trade name Poly-bd®, may be used as polyols for the compositions according to the invention.

As already set out in connection with the at least one PU prepolymer, however, the composition according to the invention in preferred embodiments has a polyester content of less than 10 wt. %, based on the total weight of the adhesive composition.

Polyacetals are likewise suitable as the polyol component. Polyacetals are understood to mean compounds as are obtainable from glycols, for example diethylene glycol or hexanediol or a mixture thereof with formaldehyde. Polyacetals which can be used within the context of the invention may likewise be obtained by polymerization of cyclic acetals. Polycarbonates are furthermore suitable as polyols. Polycarbonates may, for example, be obtained by the reaction of diols, such as propylene glycol, butanediol-1,4 or hexanediol-1,6, diethylene glycol, triethylene glycol or tetraethylene glycol or mixtures of two or more thereof with diaryl carbonates, for example diphenyl carbonate, or phosgene. Hydroxy esters of polylactones are likewise suitable.

Another group of polyols may be OH-functional polyurethane polyols, for example OH-terminated polyurethane prepolymers.

Polyacrylates bearing OH groups are likewise suitable as the polyol component. These polyacrylates may, for example, be obtained by the polymerization of ethylenically unsaturated monomers which bear an OH group. Ethylenically unsaturated carboxylic acids suitable for this purpose are for example acrylic acid, methacrylic acid, crotonic acid or maleic acid or the esters thereof with C1 to C2 alcohols. Corresponding esters bearing OH groups are for example 2-hydroxyethyl acrylate, 2-hydroxyethyl methacrylate, 2-hydroxypropyl acrylate, 2-hydroxypropyl acrylate, 2-hydroxypropyl methacrylate, 3-hydroxypropyl acrylate, or 3-hydroxypropyl methacrylate or mixtures of two or more thereof.

In some embodiments, one of the at least three different polyols of the curing component is a triol, in particular based on glycerol or trimethylolpropane (TMP), to which alkylene oxide (AO), in particular propylene oxide (PO), is added and which has a molecular weight $M_w$ of less than 700 g/mol, preferably 400 to <700 g/mol, more preferably 450 to <700 g/mol. In some embodiments, the curing component of the composition according to the invention comprises 5 to 90 wt. %, preferably 15 to 60 wt. %, in particular 25 to 40 wt. %, of at least one such triol. According to some embodiments, this at least one triol may be, in particular, a propylene oxide (PO)-based triol, such as a glycerol or TMP-initiated molecule to which propylene oxide has been added. According to preferred embodiments, the at least one triol is a propylene oxide-based triol having a molecular weight $M_w$ of at least 400, in particular at least 450 to <700 g/mol.

In some embodiments, one of the at least three different polyols of the curing component is an aliphatic, di- or polyvalent, preferably 2 to 4-valent, alcohol, preferably having a molecular weight of <150 g/mol and/or preferably having a hydroxyl number of 700-2000 mgKOH/g, more preferably 1200-1900 mgKOH/g. In some embodiments, the curing component of the composition according to the invention comprises 0.5 to 10 wt. %, preferably 2 to 8 wt. %, in particular 3 to 7 wt. %, of at least one such aliphatic alcohol. According to some embodiments, this at least one aliphatic alcohol may be an aliphatic alcohol selected from the group consisting of ethylene glycol, propylene glycol, 1,4-butanediol, 1,5-pentanediol, 1,6-hexanediol, 1,7-heptanediol, 1-8-octanediol, glycerol, trimethylolpropane and pentaerythritol. In some embodiments, the at least one aliphatic alcohol is in particular trimethylolpropane.

In some embodiments, one of the at least three different polyols of the curing component is higher-molecular-weight AO-based triols as defined above but having a molecular weight $M_w$ of more than 700 g/mol, preferably >700 to 1200 g/mol, or castor oil. In some embodiments, the curing component of the composition according to the invention comprises 5 to 80 wt. %, preferably 15 to 70 wt. %, in particular 20 to 65 wt. %, of at least one such triol or castor oil. Triols of this kind are commercially available as Voranol® CP 755 or CP 1055 (Dow Chemical). Although castor oil contains ester groups, it is not a polyester within the meaning of the present invention since it is not based on repeating units linked via ester groups.

In various embodiments of the invention, the curing component contains at least 2, preferably all three of the abovementioned polyols, i.e. (1) at least one triol, in particular based on glycerol or trimethylol propane (TMP), to which alkylene oxide (AO), in particular propylene oxide (PO), is added and which has a molecular weight $M_w$ of less than 700 g/mol, preferably 400 to <700 g/mol, more preferably 450 to <700 g/mol; (2) at least one aliphatic di- or polyvalent, preferably 2- to 4-valent, preferably monomeric alcohol; and (3) at least one triol, in particular based on glycerol or trimethylolpropane (TMP), to which alkylene oxide (AO), in particular propylene oxide (PO), is added and which has a molecular weight $M_W$ of more than 700 g/mol, preferably >700 to 1200 g/mol, or castor oil. In various embodiments, the curing component contains at least 2 different triols of those described above or one of these triols and castor oil, preferably (1) at least one triol, in particular based on glycerol or trimethylol propane (TMP), to which alkylene oxide (AO), in particular propylene oxide (PO), is added and which has a molecular weight $M_W$ of less than 700 g/mol, preferably 400 to <700 g/mol, more preferably 450 to <700 g/mol and (2) at least one triol, in particular based on glycerol or trimethylolpropane (TMP), to which alkylene oxide (AO), in particular propylene oxide (PO), is added and which has a molecular weight $M_W$ of more than 700 g/mol, preferably >700 to 1200 g/mol, or castor oil. In particularly preferred embodiments, the third component, i.e. the aliphatic di- or polyvalent, preferably 2- to 4-valent, preferably monomeric alcohol is also contained.

It may be preferred in various embodiments that the content of polyesters in the laminating adhesive composition is as low as possible, i.e. less than 10 wt. % for example, based on the total weight of the composition. "Polyester" herein refers to polyester units in the resin component and to those in the curing component. However, the same can also apply only to the curing component, i.e. the curing component contains, based on the total weight thereof, less than 10 wt. % polyester. In particularly preferred embodiments, the curing components according to the invention, more preferably the compositions according to the invention, are free of polyesters. "Free from" as used in this context means that the corresponding composition does not contain the stated constituent, i.e. polyester, or does not contain it as an intentionally added constituent. The amount of the constituent in the particular composition is therefore preferably less than 1 wt. %, more preferably less than 0.5 wt. %, even more preferably less than 0.1 wt. %, most preferably less than 0.01 wt. %, or below the detection limit.

In some embodiments, the NCO:OH ratio of resin component to curing component is less than 1.4, preferably less than 1.3, in particular less than 1.25, more preferably between 1.0 and 1.2.

In various embodiments, the binder system described herein may also contain at least one catalyst, in particular selected from metal catalysts based on Sn or Ti or amine catalysts. Suitable catalysts are known in the prior art. The catalyst is preferably contained in the curing component, i.e. in the systems preferred according to the invention in the hydroxy-functionalized component.

The adhesive according to the invention may also contain the usual additives. The additional constituents are, for example, resins (tackifiers), stabilizers, crosslinking agents or viscosity regulators, pigments, plasticizers or antioxidants.

Furthermore, the adhesives according to the invention may also contain fillers. However, in various embodiments of the invention, the adhesive composition does not contain a solid particulate filler in which at least 90% of the filler particles have a particle size of 4 μm or less and which has a Mohs hardness of 3 or less, in particular not in an amount of 5 to 50 wt. % based on the adhesive composition. In various embodiments, the filler is not calcium carbonate, in particular not calcium carbonate that satisfies the above particle size and Mohs hardness specifications. In further embodiments, the composition may preferably be substantially free of, or free of, fillers.

The polyurethane adhesives according to the invention are liquid at application temperatures. It is preferable for the PU adhesives according to the invention to be liquid at room temperature. In various embodiments, the compositions described herein have, at a temperature of 40° C., a viscosity of 500 to 5000, in particular 600 to 900 mPas, determined in accordance with DIN ISO 2555 (Brookfield viscometer RVT, spindle no. 4, 25° C.; 5 rpm).

The adhesives described herein may contain solvents or may be solvent-free. In principle, all solvents known to a person skilled in the art can be used as the solvent, in particular esters, ketones, halogenated hydrocarbons, alkanes, alkenes and aromatic hydrocarbons. Examples of solvents of this kind are methylene chloride, trichloroethylene, toluene, xylene, butyl acetate, amyl acetate, isobutyl acetate, methyl isobutyl ketone, methoxybutyl acetate, cyclohexane, cyclohexanone, dichlorobenzene, diethyl ketone, di-isobutyl ketone, dioxane, ethyl acetate, ethylene glycol monobutyl ether acetate, ethylene glycol monoethyl acetate, 2-ethylhexyl acetate, glycol diacetate, heptane, hexane, isobutyl acetate, isooctane, isopropyl acetate, methyl ethyl ketone, tetrahydrofuran, or tetrachloroethylene, or mixtures of two or more of the stated solvents.

However, in preferred embodiments, the adhesive compositions described herein are substantially free of organic solvents. "Free from" as used above means that the corresponding composition does not contain the stated constituent or does not contain it as an intentionally added constituent. The amount of the constituent in the particular composition is therefore preferably less than 1 wt. %, more preferably less than 0.5 wt. %, even more preferably less than 0.1 wt. %, most preferably less than 0.01 wt. %, or below the detection limit.

The adhesives are applied to the substrates to be bonded, in particular films, using conventional equipment and using all of the commonly used application methods, for example, by spraying, doctoring, ¾-roller coating assemblies in the case of the use of a solvent-free system, or 2-roller coating assemblies in the case of the use of a solvent-containing system. After the applications, the substrates to be bonded are bonded to one another in a known manner. In this case, it is expedient to use optionally elevated temperatures in order to achieve better application and a faster crosslinking reaction. However, the adhesives according to the invention already exhibit very favorable curing at room temperature or only slightly elevated temperatures, such as 40° C.

The polyurethane adhesives according to the invention are suitable in particular as laminating adhesives for films. They may be used in a process in which known films based on polymers, such as PP, PE, OPA, polyamide, PET, polyester and metal foils, are bonded to one another. In this case, the adhesive according to the invention is applied to an optionally pretreated or printed film. The application amount is usually 1-5 g/m$^2$. This may take place at elevated temperature in order to obtain a thin and uniform coating. A second film of identical or a different material is then laminated thereon under pressure. Heat may be applied, the adhesive crosslinks and a multilayer film is obtained. This film may optionally also consist of more than two layers.

The films are conventionally placed in storage after production. During this time, it is possible for the adhesives according to the invention to crosslink further.

Due to the use of the liquid or hot-melt adhesives according to the invention as the laminating adhesive, it is possible to obtain laminated two-layer or multilayer films which meet the stringent requirements for suitability for food or medical packaging.

It shall be readily understood that all embodiments disclosed herein in connection with the PU adhesive can also be used for the uses and methods described, and vice versa.

The invention shall be described in further detail below with reference to several examples. Unless stated otherwise, the amounts specified are in wt %.

EXAMPLES

Example 1

According to the Invention

Resin Base:
NCO-terminated MDI prepolymer having an NCO content of 12-14 wt. % and an NCO:OH ratio of 3.9:1, consisting of
50 wt. % of 4,4'-diphenylmethane diisocyanate (MDI); 5 wt. % polypropylene glycol (PPG) having Mw=400 g/mol; 25 wt. % polypropylene glycol (PPG) having Mw=1000 g/mol; 10 wt. % polypropylene glycol (PPG) having Mw=2000 g/mol; 10 wt. % hexane-1,6-diisocyanate (HDI) trimer.

Curing Agent:
Polyol mixture having an OH value of 330-370 mgKOH/g and a functionality f=3, consisting of
5 wt. % trimethylolpropane; 70 wt. % trifunctional polypropylene glycol (PPG) having Mw=450 g/mol; 25 wt. % castor oil.
Mixing ratio of resin:curing agent=100:40 parts by weight Example 2

According to the Invention

Resin Base:
NCO-terminated MDI prepolymer having an NCO content of 12-14 wt. % and an NCO:OH ratio of 3.9:1, consisting of
50 wt. % of 4,4'-diphenylmethane diisocyanate (MDI); 5 wt. % polypropylene glycol (PPG) having Mw=400 g/mol; 25 wt. % polypropylene glycol (PPG) having Mw=1000 g/mol; 10 wt % polypropylene glycol (PPG) having Mw=2000 g/mol; 10 wt % hexane-1,6-diisocyanate (HDI) trimer.

Curing Agent:
Polyol mixture having an OH value of 270-310 mgKOH/g and a functionality f=3, consisting of
5 wt. % trimethylolpropane; 30 wt. % trifunctional polypropylene glycol (PPG) having Mw=450 g/mol; 65 wt. % castor oil.
Mixing ratio of resin:curing agent=100:50 parts by weight Example 3

According to the Invention

Resin Base:
NCO-terminated MDI prepolymer having an NCO content of 11.5-13.5 wt. % and an NCO:OH ratio of 3.9:1, consisting of
50 wt. % 4,4'-diphenylmethane diisocyanate (MDI); 5 wt. % polypropylene glycol (PPG) having Mw=400 g/mol; 25 wt. % polypropylene glycol (PPG) having Mw=1000 g/mol; 10 wt. % polypropylene glycol (PPG) having Mw=2000 g/mol; 10 wt. % toluene diisocyanate (TDI) prepolymer*.

Curing Agent:
Polyol mixture having an OH value of 330-370 mgKOH/g and a functionality f=3, consisting of
5 wt % trimethylolpropane; 70 wt. % trifunctional polypropylene glycol (PPG) having Mw=450 g/mol; 25 wt. % castor oil.
*TDI prepolymer: Reaction product of 2,4'-TDI with a polyether diol having Mw=400 . . . 1000, demonomerized
Mixing ratio of resin:curing agent=100:40 parts by weight Example 4

Comparative Example

Resin Base:
NCO-terminated MDI prepolymer having an NCO content of 12.0-13.5 wt. % and an NCO:OH ratio of 3.1:1, consisting of
55 wt. % 4,4'-diphenylmethane diisocyanate (MDI); 15 wt. % polypropylene glycol (PPG) having Mw=1000 g/mol; 15 wt. % polypropylene glycol (PPG) having Mw=400 g/mol; 15 wt. % bifunctional polyester*.

Curing Agent:
  Polyol mixture having an OH value of 155-175 mgKOH/g and a functionality f=3, consisting of
    100 wt. % castor oil.
  *Polyester based on isophthalic acid, adipic acid, 1,2-propanediol, diethylene glycol.
  Mixing ratio of resin:curing agent=100:75 parts by weight

Example 5

Comparative Example

Resin Base:
  NCO-terminated MDI prepolymer having an NCO content of 13.0-15.0 wt % and an NCO:OH ratio of 3.7:1, consisting of 51 wt. % 4,4'-diphenylmethane diisocyanate (MDI); 10 wt % 1,6-hexane diisocyanate (HDI) trimer; 13 wt % polypropylene glycol (PPG) having Mw=1000 g/mol; 13 wt. % polypropylene glycol (PPG) having Mw=400 g/mol; 13 wt. % bifunctional polyester*.
Curing Agent:
  Polyol mixture having an OH value of 200-230 mgKOH/g and a functionality f~2.3, consisting of
    75 wt % bifunctional polyester; 22 wt. % polypropylene glycol (PPG) trial having Mw=450 g/mol; 3 wt. % trimethylolpropane.
  *Polyester based on isophthalic acid, adipic acid, 1,2-propanediol, diethylene glycol.
  Mixing ratio of resin:curing agent=100:65 parts by weight

Example 6

Comparative Example

Resin Base:
  NCO-terminated MDI prepolymer having an NCO content of 11.0-13.0 wt. % and an NCO:OH ratio of 2.6:1, consisting of
    30 wt % 4,4'-diphenylmethane diisocyanate (MDI); 5 wt. % toluene diisocyanate (TDI); 10 wt. % 1,6-hexane diisocyanate (HDI) trimer; 15 wt. % polypropylene glycol (PPG) having Mw=400 g/mol; 20 wt. % polypropylene glycol (PPG) having Mw=1000 g/mol; 10 wt. % polypropylene glycol (PPG) having Mw=2000 g/mol; 10 wt. % bifunctional polyester*.
  *Polyester based on isophthalic acid, adipic acid, 1,2-propanediol, diethylene glycol.
Curing Agent:
  Polyol mixture having an OH value of 240-270 mgKOH/g and a functionality f~2.3, consisting of
    15 wt. % bifunctional polyester A*; 50 wt. % bifunctional polyester B**; 10 wt. % polypropylene glycol (PPG) having Mw=400 g/mol; 20 wt. % polypropylene glycol (PPG) triol having Mw=450 g/mol; 5 wt. % trimethylolpropane.
    Mixing ratio of resin:curing agent=100:45 parts by weight
    *Polyester A based on isophthalic acid, adipic acid, 1,2-propanediol, diethylene glycol.
    **Polyester B based on isophthalic acid, adipic acid, diethylene glycol.

Example 7

Comparative Example

Resin Base:
  NCO-terminated TDI prepolymer having an NCO content of 9.0-10.5 wt. %, consisting of 100 wt. % toluene diisocyanate (TDI) prepolymer*.
Curing Agent:
  Polyester mixture having an OH value of 155-175 mgKOH/g and a functionality f=2.5, consisting of
    100 wt. % polyester C***
  *TDI prepolymer: Reaction product of 2,4'-TDI with a polyether diol having Mw=400 . . . 1000, demonomerized.
  ***Polyester C based on isophthalic acid, diethylene glycol, castor oil.
  Mixing ratio of resin:curing agent=100:55 parts by weight
Composite Film:
  The composite films are produced using a Super Combi 2000 laminator. The adhesive composition is applied in an amount of 2 g/m² to one of the films to be bonded (OPA or metOPP) and this film is then laminated under pressure with the second film (PE or OPP). The effective roller pressure of the laminating unit corresponds to a force of up to 200 N (20 kg).
Bond Adhesion:
  The bond adhesion is determined by means of a tensile testing machine from Instron (Instron 4301) on the basis of the DIN 53357 standard after 14 days of curing at room temperature. For this purpose, test strips of the composite film (sample width of 15 mm) are clamped between clamping jaws and then pulled apart at a pull-off speed of 100 m/min, a pull-off angle of 90° and a pull-off length of 5 to 10 cm. The mean value of a triple determination of the maximum applied force in relation to the sample width of 15 mm is given.
Primary Aromatic Amines (PAA) Content:
  The time to wait after bonding the films until the adhesive is considered to be "substantially migration-free" is indicated. This is the case when the content of primary aromatic amines (PAA) is less than 0.2 pg/100 ml of filling material. 3% acetic acid is used as filling material or filling material simulant. The packaging used is an OPA/PE laminate which is produced by means of the adhesive and encloses the filling material by means of heat sealing, the PE side forming the inside of the packaging and the inside of the sealing seam. The content of primary aromatic amines is determined by photometry according to § 64 of the Food, Commodities and Feed Code of the Federal Republic of Germany (LFGB) according to the method L 00.006.
Composite Materials:
OPA: oriented polyamide
PE: polyethylene
PET: polyethylene terephthalate
OPP: oriented polypropylene
metOPP: metallized OPP (OPP coated with aluminum)

TABLE 1

| | Experimental parameters | | |
|---|---|---|---|
| | Parameter | Widest range | Narrowest range |
| 1 | Mixing viscosity at application temperature | <1000 mPas | 600-900 mPas |
| 2 | Pot life/viscosity increase | <5000 mPas after 30 min <25,000 mPas after 60 | <4500 mPas after 30 min <20,000 mPas after 60 |

TABLE 1-continued

Experimental parameters

| | Parameter | Widest range | Narrowest range |
|---|---|---|---|
| 3 | Run time: Experimental trial on lamination equipment | Super Combi machine >300 m/min without misting | Super Combi machine >300 m/min without misting |
| 4 | Increase in bond strength: PET/PE | >3 N/15 mm after 1 day | PET tear after 1 day |
| 5 | Crease test | No delamination after 1 day | No delamination after 1 day |
| 6 | PAA | PAA-free after <5 days | PAA-free after <5 days |

The invention claimed is:

1. A polyurethane 2-component adhesive composition comprising:
(a) a resin component including at least one NCO-terminated polyurethane prepolymer prepared from a reaction mixture comprising at least 40 wt. % of a diphenylmethane diisocyanate (MDI) and one or more polyether diols, wherein the MDI is 4,4'-diphenylmethane diisocyanate or a mixture of 4,4'-diphenylmethane diisocyanate and 2,4'-diphenylmethane diisocyanate, and
(b) a curing component comprising a mixture of polyols, wherein the mixture of polyols comprises:
i) 3.0 to 7.0 wt. %, relative to the total weight of the curing component, of a first polyol, the first polyol being an aliphatic alcohol selected from the group consisting of ethylene glycol, propylene glycol, 1,4-butanediol, 1,5-pentanediol, 1,6-hexanediol, 1,7-heptanediol, 1,8-octanediol, glycerol, trimethylolpropane, and pentaerythritol,
ii) 25 to 40 wt. %, relative to the total weight of the curing component, of a second polyol, the second polyol being a triol, to which an alkylene oxide is added and which has a weight average molecular weight $M_w$ of at least 400 g/mol and less than 700 g/mol, and
iii) 20 to 65 wt. %, relative to the total weight of the curing component, of castor oil, to which an alkylene oxide is added,
wherein:
the 2-component adhesive composition has a polyester content of less than 10 wt. %, based on the total weight of the 2-component adhesive composition, and
the 2-component adhesive composition does not contain a solid particulate filler in which at least 90% of filler particles of the solid particulate filler have a particle size of 4 μm or less and a Mohs hardness of 3 or less.

2. The 2-component adhesive composition of claim 1, wherein the first polyol is trimethylolpropane.

3. The 2-component adhesive composition of claim 1, wherein the composition has a viscosity of from 500 mPa·s to 5000 mPa·s at a temperature of 40° C.

4. The 2-component adhesive composition of claim 1, wherein an NCO:OH ratio of the resin component to the curing component is less than 1.4.

5. The 2-component adhesive composition of claim 1, wherein the mixture of polyols consists of the first polyol, the second polyol, and the castor oil to which an alkylene oxide is added, wherein:
the triol of the second polyol is glycerol or trimethylolpropane, and
the alkylene oxide of the second polyol is propylene oxide.

6. The 2-component adhesive composition of claim 1, wherein:
(a) the composition further comprises at least one catalyst; and/or
(b) the composition is substantially free of organic solvents.

7. A cured reaction product formed from the 2-component adhesive composition of claim 1, the cured reaction product bonding a first flexible plastic film or metal foil to a second flexible plastic film or metal foil.

8. A method for producing a flexible multilayer composite film, the method comprising:
providing a first film and a second film, wherein the first and second films are identical or different flexible plastic films or metal foils;
mixing the resin component and the curing component of the 2-component adhesive composition of claim 1 at a predetermined NCO: OH ratio to form a laminating adhesive;
applying the laminating adhesive over some a portion of a surface of the first film;
disposing the second film over the laminating adhesive on the surface of the first film; and
curing the laminating adhesive to bond the first film to the second film to form the flexible multilayer composite film.

9. The method of claim 8, wherein the laminating adhesive is applied to the portion of the surface of the first film in an amount of from 1 to 5 g/m².

10. The method of claim 8, wherein the laminating adhesive has a viscosity of from 500 mPa·s to 900 mPa·s at 40° C. and the flexible multilayer composite film has less than 10 parts per billion of primary aromatic amines (PAA) after 5 days of curing.

11. A flexible multilayer composite film produced by the method of claim 8.

12. A package comprising a flexible multilayer composite film produced by the method of claim 8, the package sealingly disposed around a food product.

13. The 2-component adhesive composition of claim 1, wherein the mixture of polyols consists of:
the first polyol, wherein the first polyol is trimethylolpropane;
the second polyol, wherein the triol of the second polyol is glycerol or trimethylolpropane and the alkylene oxide of the second polyol is propylene oxide; and
castor oil to which an alkylene oxide is added.

14. The 2-component adhesive composition of claim 1, wherein the reaction mixture, from which the NCO-terminated polyurethane prepolymer is prepared, consists of the diphenylmethane diisocyanate (MDI) and the one or more polyether diols, wherein the one or more polyether diols are polypropylene glycols.

15. The 2-component adhesive composition of claim 1, wherein the reaction mixture, from which the NCO-terminated polyurethane prepolymer is prepared, consists of the diphenylmethane diisocyanate (MDI), hexane diisocyanate trimer, and the one or more polyether diols, wherein the one or more polyether diols are polypropylene glycols.

16. A flexible, multilayer composite sheet for food or medical packaging, the flexible, multilayer composite sheet comprising:
a first flexible plastic film or metal foil;
a second flexible plastic film or metal foil; and
a cured reaction product of a polyurethane 2-component adhesive composition disposed between the first flexible plastic film or metal foil and the second flexible plastic film or metal foil, the 2-component adhesive composition comprising:
(a) a resin component consisting of polyisocyanates, the polyisocyanates including at least one NCO-terminated polyurethane prepolymer prepared by reacting at least 40 wt. % of a diphenylmethane diisocyanate (MDI) and optionally a hexane diisocyanate trimer with one or more polyether diols, wherein the MDI is 4,4'-diphenylmethane diisocyanate or a mixture of 4,4'-diphenylmethane diisocyanate and 2,4'-diphenylmethane diisocyanate;
(b) a curing component consisting of a mixture of polyols, wherein the mixture of polyols comprises:
i) 3.0 to 7.0 wt. %, relative to the total weight of the curing component, of a first polyol, the first polyol being an aliphatic alcohol selected from the group consisting of ethylene glycol, propylene glycol, 1,4-butanediol, 1,5-pentanediol, 1,6-hexanediol, 1,7-heptanediol, 1,8-octanediol, glycerol, trimethylolpropane, and pentaerythritol,
ii) 25 to 40 wt. %, relative to the total weight of the curing component, of a second polyol, the second polyol being a triol, to which an alkylene oxide is added and which has a weight average molecular weight Mw of at least 400 g/mol and less than 700 g/mol, and
iii) 20 to 65 wt. %, relative to the total weight of the curing component, of castor oil, to which an alkylene oxide is added; and
(c) optionally one or more of a catalyst, a resin, a tackifier, a stabilizer, a crosslinking agent, a viscosity regulator, a pigment, a plasticizer, an antioxidant, or a filler in either or both of component (a) and component (b);
wherein:
the 2-component adhesive composition has a polyester content of less than 10 wt. %, based on the total weight of the 2-component adhesive composition, and
the 2-component adhesive composition does not contain a solid particulate filler in which at least 90% of filler particles of the solid particulate filler have a particle size of 4 µm or less and a Mohs hardness of 3 or less.

17. The flexible, multilayer composite sheet of claim 16, wherein the 2-component adhesive composition comprises one or more of the catalyst, the resin, the tackifier, the stabilizer, the crosslinking agent, the viscosity regulator, the pigment, the plasticizer, the antioxidant, or the filler.

18. The 2-component adhesive composition of claim 1, wherein the resin component further comprises hexane-1,6-diisocyanate trimer.

19. The 2-component adhesive composition of claim 1, wherein the 2-component adhesive composition is free of solvent.

20. The 2-component adhesive composition of claim 1, wherein the NCO-terminated polyurethane prepolymer has a number average molecular weight $M_n$ ranging from 2,000 g/mol to 50,000 g/mol and an NCO content of from 5 to 20 wt %.

* * * * *